United States Patent [19]

Stewart

[11] Patent Number: 4,932,878
[45] Date of Patent: Jun. 12, 1990

[54] SYSTEM OF ILLUMINABLE MODULES FOR COMPOSING ALPHANUMERICS AND DECORATIVE PATTERNS

[76] Inventor: Mark R. Stewart, 60 Pleasant St. #2, Cambridge, Mass. 02139

[21] Appl. No.: 393,278

[22] Filed: Aug. 14, 1989

Related U.S. Application Data

[62] Division of Ser. No. 165,180, Mar. 7, 1988, Pat. No. 4,877,405.

[51] Int. Cl.⁵ .......................... G09B 1/06; G09B 11/00
[52] U.S. Cl. ...................................... 434/160; 434/97
[58] Field of Search .................... 434/160, 81, 83, 96, 434/97

[56] References Cited

U.S. PATENT DOCUMENTS 1,213,690  1/1917  Quinones ............................... 434/96
4,877,405  10/1989  Stewart ................................ 434/160

FOREIGN PATENT DOCUMENTS 694042  7/1953  United Kingdom ................ 434/160

Primary Examiner—William H. Grieb

[57] ABSTRACT

A system for composing alphanumeric characters and/or decorative designs from modules containing line segments. The line segments within each module are to be provided with means to make each line segment differentially visible, for example light-emitting diodes, liquid crystal displays, etc. The arrangement of line segments within the modules is the means whereby a variety of typefaces previously unobtainable in illuminated lettering or signage is now made available through the use of the present invention. Two module types, each with a different arrangement of line segments within, are herein specified.

6 Claims, 6 Drawing Sheets

SYSTEM OF ILLUMINABLE MODULES FOR COMPOSING ALPHANUMERICS AND DECORATIVE PATTERNS

BACKGROUND—FIELD OF INVENTION

This invention is a means for composing alphanumeric symbols and/or decorative patterns from illuminable line segments. This is a divison of Ser. No. 07/165,180 filed by this same applicant on 03/07/88, now U.S. Pat. No. 4,377,409 issued 10/31/89.

BACKGROUND—DISCUSSION OF THE PRIOR ART

Many methods for composing alphanumeric symbols (letters and numbers, hereinafter "alphanumerics") from line segments exist. However, each one of these systems has its limitations and, as a result, many of these systems have never been commercially utilized. Those few systems that have been used commercially have been used only in a specific field, e.g., in games, educational apparatus, signage with illuminable or reflective materials, or signage with non-illuminable materials. Moreover, even within each specific field all of these systems have major limitations and thus have only been used in a very specific settings.

The signage systems using differentially-activated lines and illuminable materials have the following limitations:

(1) because only one basic arrangement of line segments, known as the Union Jack, with minor variations upon it, is used, only one basic typeface is available, (2) because of the arrangement of line segments in the Union Jack some of the letters in this typeface are not always easily identifiable, and/or in a form appropriate for all signage uses, (3) the Union Jack does not permit the creation of any aesthetic decorative patterns, (4) because the lines in the Union Jack do not extend to the edges of the module no interconnections between modules is possible, (5) and also because the lines in the Union Jack do not extend to the edges of the modules it is not possible to construct "moving" illuminable signage, i.e., signage that appears to move across a fixed point.

Resultingly, the system based on the Union Jack has found use only in small-scale non-moving illuminable signage where the aesthetic and other limitations are either of less concern or less noticeable. U.S. Pat. No. 3,106,696 to Foley, 10/08/63; and U.S. Pat. No. 3,971,012 to Morokawa et al, 07/20/76; and others demonstrate the Union Jack arrangement of line segments.

OBJECTS AND ADVANTAGES (The parent application, cited above on page 1, details a system of comprising alphanumerics from non-illuminable materials. This divisional application discusses only the use of a system, based upon the system in the parent application, for the creation of alphanumerics from illuminable or reflective materials).

The present invention overcomes the limitations mentioned above. Specifically, the novel arrangement of lines in the present invention permits the creation of at least three different basic typefaces with their variations, these typefaces having alphanumerics which are both easily recognizeable and appropriate for many different signage uses. Also, the present invention permits the creation of decorative patterns of significant aesthetic interest and, because of the possibility of interconnections between modules, of virtually unlimited variety. The fact of the lines in the modules extending to the edges, which is not the case in the Union Jack arrangement, permits the creation of illuminated signage that gives the appearance of moving across a fixed point.

Moreover, because the present invention can be used in conjunction with the system in the above-mentioned parent application, it is thereby possible to create signage with mixed illuminable and non-illuminable materials that retains the same typefaces and aesthetic presentation.

Futher objects and advantages will be apparent from a consideration of the accompanying drawings and ensuing description.

DRAWING REFERENCE NUMBERS 1 module
2 module
3 horizontally elongated module
4 vertically elongated module

DETAILED DESCRIPTION OF THE INVENTION

Figure 1:
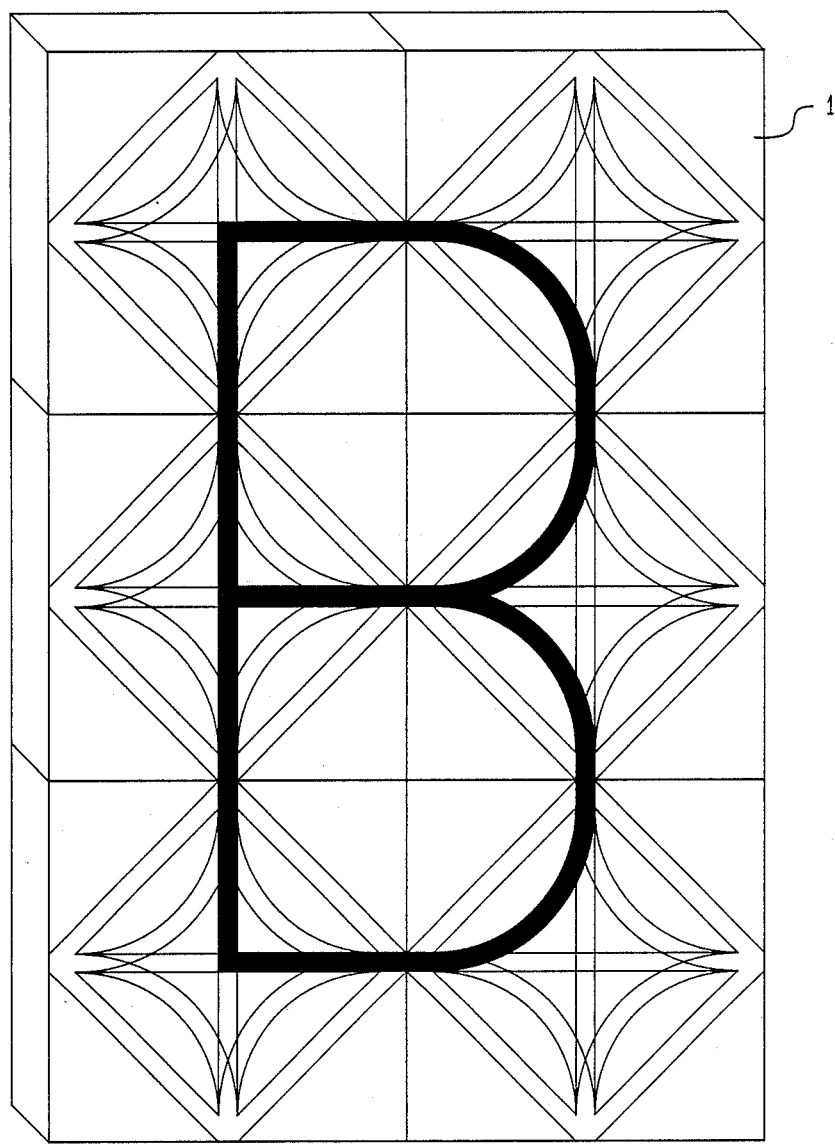
FIG. 1 is a perspective view of an alphanumeric character formed by assembling six identical modules.

FIG. 1—Modules Composed of Differentially Visible Line Segments, First Form

In accordance with the invention, alphaunumeric characters are composed by utilization of an array of modules of module type 1, as illustrated here in FIG. 1. Module 1 contains a pattern of lines that can be made differentially visible through illumination, reflexion or other means. FIG. 1 illustrates the construction of the letter "B" by means of selective visual emphasis of certain line segments in a coplanar array of six identical modules of type 1. Differential visibility of the line segments contained in these modules can be accomplished by their being constructed of some illuminable or reflective material such as gas-discharge tubes, liquid crystal displays, light-emitting diodes, laser sensitive displays, etc., and by then providing electrical circuitry that could differentially activate these materials.

While the lines in the modules all originate at the midpoints of the edges of the modules, other points offset from the midpoint could also be used for origination of the lines with the result of the creation of different typeface or font styles.

Additionally, though all modules shown here are rectangles, other regular polygons can also be used in their place. Specifically, those regular polygons that are essentially squares or rectangels with cut-off corners, e.g., octagons, dodecahedrons, etc., would form identical modules to those illustrated here except for those cut off corners. Other polygons whose shape do not approximate rectangles, e.g., hexogons, can also be used to form the modules in slightly variant forms.

Figure 2:
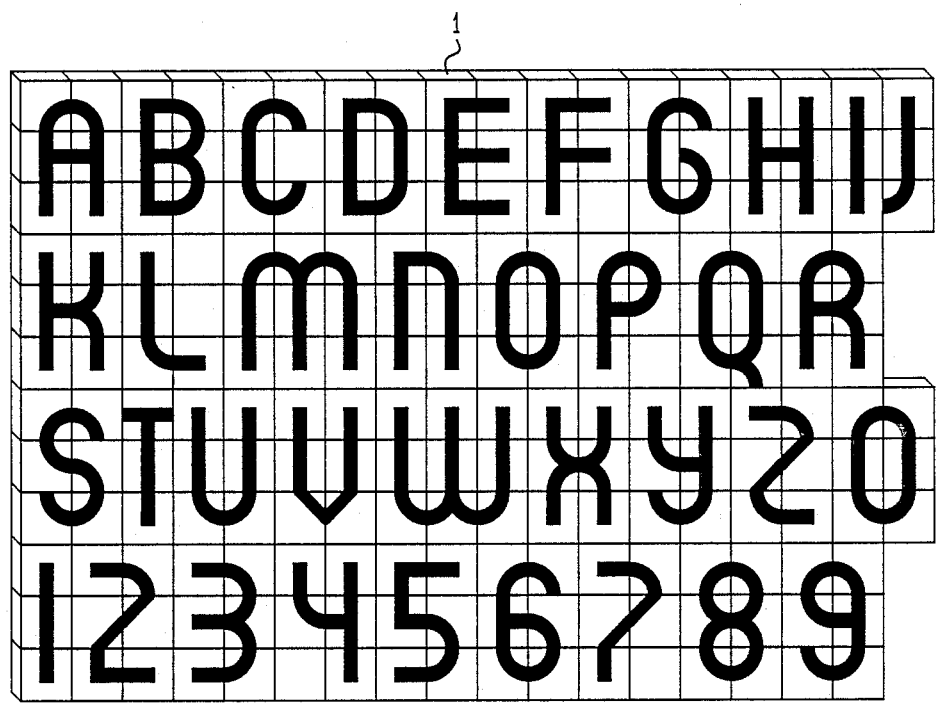
FIG. 2 is a perspective view of an assemblage of alphanumerics in a round font style created by assembling the modules of FIG. 1.

FIG. 2—Assembled Alphanumerics, Round Font

Module 1 of FIG. 1 can be used to form any alphanumeric in a round graphic font style, as illustrated in FIG. 2.

Similarly, all the characters of the Latin alphabet and the Arabic numbers can be formed by the use of module 1, as illustrated. Most of the alphanumerics are formed using an array of modules that is two modules wide and three modules high, as illustrated with the letter "B" in FIG. 1. Certain alphanumerics, such as "I", "J", "T", and "1", may be formed by the use of an array only one module wide and three modules high. Others, such as "M" and "W", require the use of an array of nine modules, as illustrated here.

The modules can be constructed in any size to yield a letter size appropriate to the desired use. The actual height of the characters formed will be twice the height of the module used and the actual width of the character will be the same as the width of the module used, except for the exceptions such as "I", "J", "T", "M" and "W", as mentioned above. The modules, by virtue of the unadorned space within them, will create the proper letter spacing when words are written.

Figure 3:
FIG. 3 is a perspective view of an assemblage of the alphanumerics in a square font style created by assembling the modules of FIG. 1.

FIG. 3—Assembled Alphanumerics, Square Font

FIG. 3 illustrates another graphic style of alphanumerics, a square font style, formed by using the same module 1 in arrays as discussed above under FIG. 2. It should be noted that some letters appear in more than one form, i.e., various alternative forms of letters are illustrated. For example, "C", "G", "L", "S", and other letters are illustrated in both serif and sans-serif styles. Other variant forms of letters are not illustrated but are fashionable from these same modules within the scope of the invention.

Figure 4:
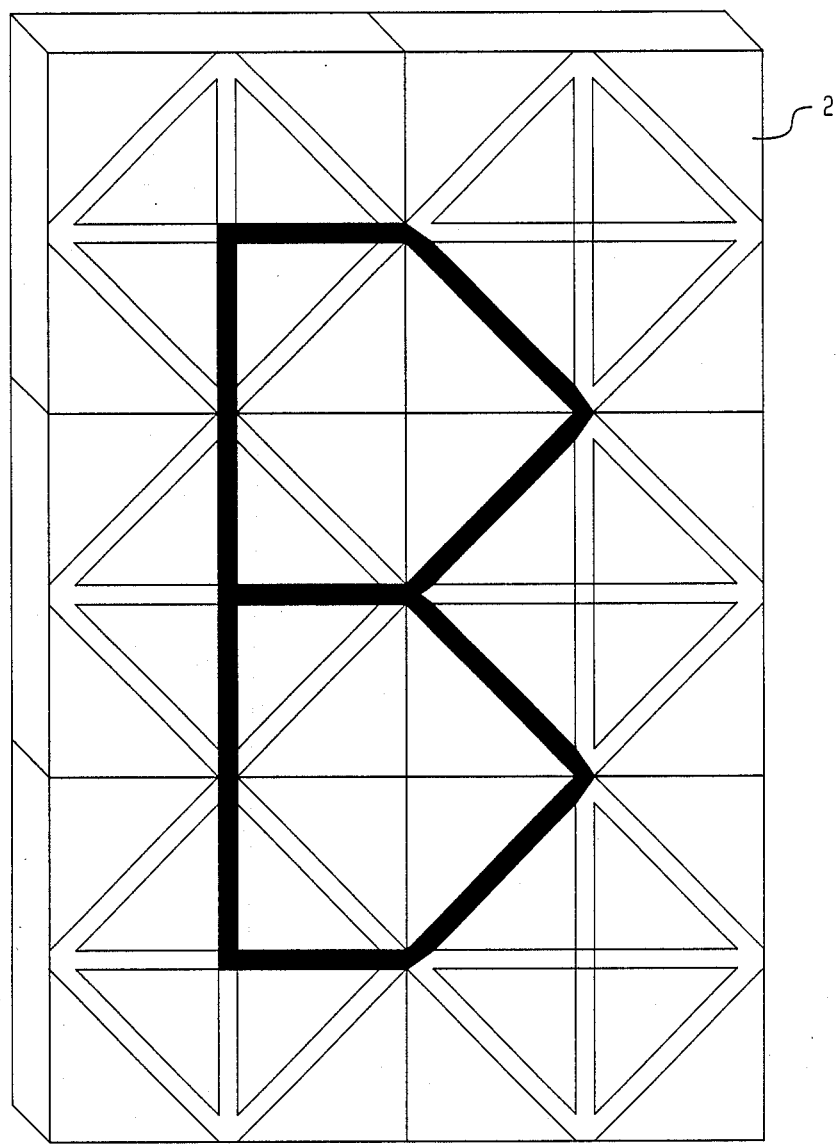
FIG. 4 is a perspective view of an alphanumeric character formed by assembling six identical modules with a line configuration different from those of FIG. 1.

FIGS. 4—Modules Composed of Differentially Visible Line Segments, Second Form FIG. 4 illustrates a module 2 of similar construction to module 1 of FIG. 1 except for the configuration of the line segments on this module 2. Module 2 has considerably fewer line segments because it lacks the curvilinear line segments that appear on module 1. Like module 1, the lines on module 2 can be made differentially visible through selective illumination, reflexion, or other means. FIG. 4 illustrates the construction of the letter "B" by means of selective visual emphasis of certain line segments in a coplanar array of six identical modules of type 2. While module 2 offers greater economy than module 1 it cannot be used to create the round or square fonts illustrated in FIGS. 2 and 3.

Figure 5:
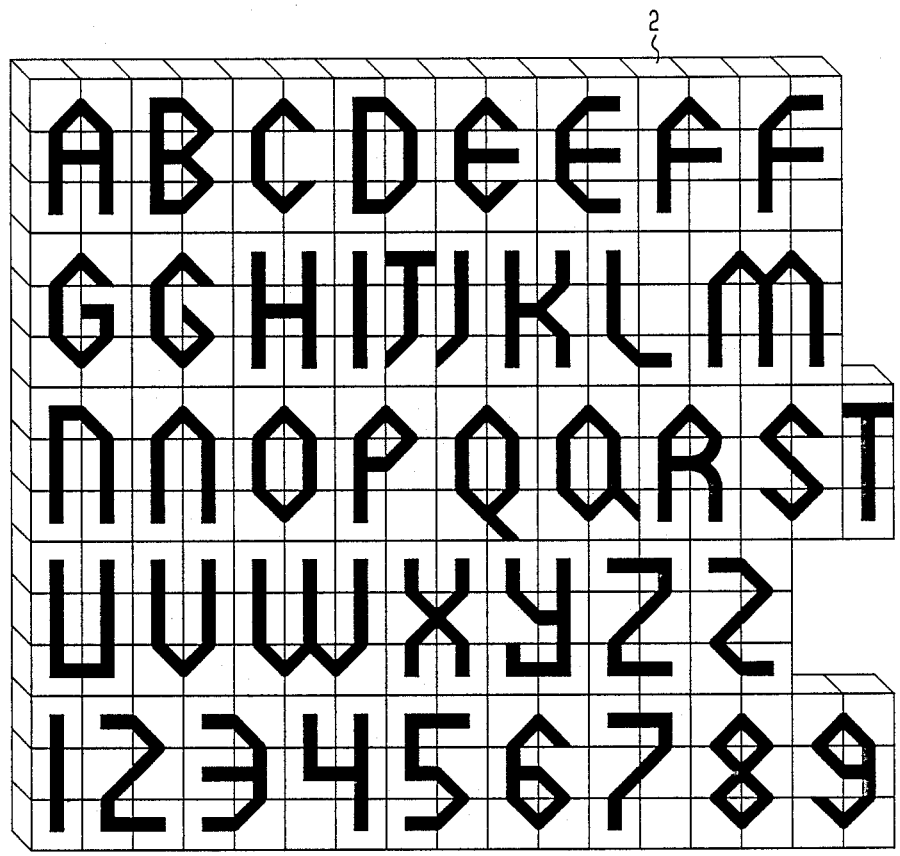
FIG. 5 is a perspective view of an assemblage of the alphanumerics in a gothic font style using the modules of FIG. 4.

FIG. 5—Assembled Alphanumerics, Gothic Font

FIG. 5 illustrates the use of module 2 to create the alphanumerics in an anglar or Gothic font. Construction of the alphanumerics using this module is essentially the same as described above under FIG. 2.

FIG. 6—Elongated Modules

Figure 6A:
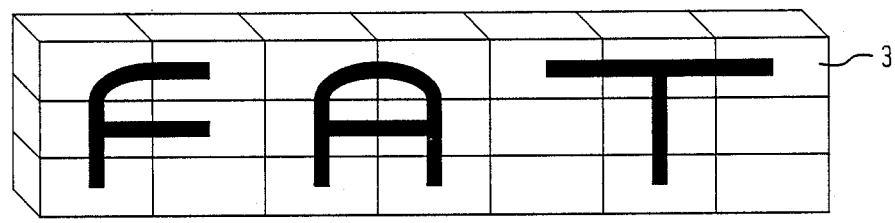
FIG. 6 (parts a & b) are perspective views of words written in (a) an elongated and (b) a compressed fashion, by using modules having a non-square rectangular shape.
Figure 6B:
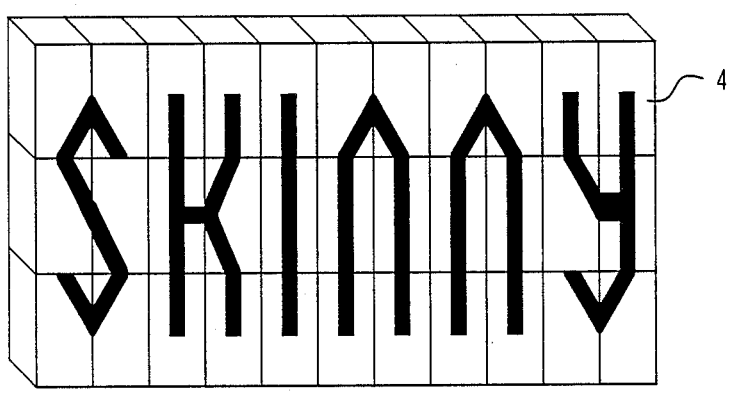

FIG. 6 (parts a & b) illustrates that the rectangular modules need not be square for the system to function properly. As shown, the module rectangles can be elongated along their horizontal edges, such as module 3, so as to create a squat graphic look (FIG. 6a), or they may be elongated along their vertical edges, such as module 4, so as to create a tall graphic style (FIG. 6b).

FIGS. 7—Figurative and Decorative Designs

Figure 7A:
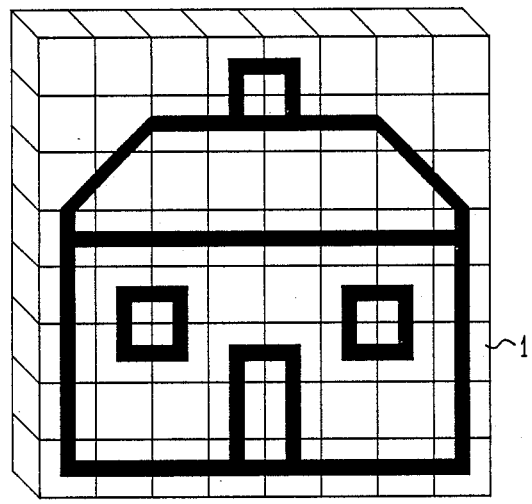
FIG. 7 (parts a, b, & c) are perspective views of the figurative and decorative designs created by use of the modules illustrated in FIGS. 1 and 4.
Figure 7B:
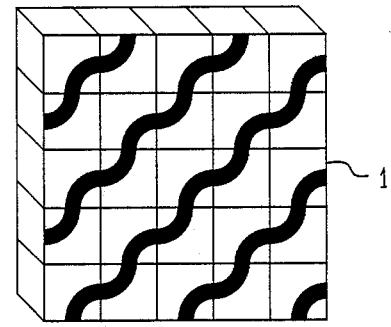
Figure 7C:
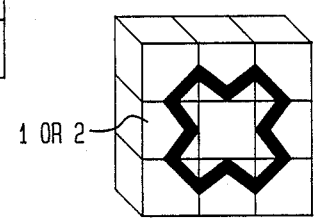

FIG. 7 (parts a, b, & c) illustrates a few of the many figurative or decorative designs that may be created by making certain line segments selectively visible in either module 1 or module 2. FIG. 7a illustrates a building created with the use of module 1 or 2. FIG. 7b illustrates a repetitive pattern created with the use of module 1. FIG. 7c illustrates an emblem created through the use of either module 1 or 2. These illustrations of figurative and decorative designs are examples only and are not meant to limit the invention to these specific designs. All designs fashionable with the modules are included in this invention.

OPERATION OF THE INVENTION

The modules described above can be used to create alphanumerics and decorative designs. They have utility in the manufacture of signage of the illuminable or reflective type and could be manufactured to be of liquid crystal type, light-emitting diodes, gas-discharge tubes, or laser-sensitive materials. They could be used in any of the present applications of that type of signage such as LED displays on electronic equipment, illuminated advertising displays, signage on buses and in transportation terminal, etc. In addition, because of the choice of graphic styles available from the design of the present invention and the aesthetic value and recognizeability of the alphanumerics composed, the invention would expand the use of line segment-or dot matrix-composed alphanumerics to situations in which they are now not commonly used. For example, the invention would be useful in a situation where a more elegant graphic style, a choice of graphic styles and/or a larger format were desired.

The possibilities of application are broadly outlined here and any signage device not specifically mentioned yet employing the specific modules described here is clearly within the scope of the present invention. Moreover, other non-signage use of the invention is also clearly within the scope of the invention and examples mentioned here are not meant to be exhaustive. Any other uses of the modules of the invention is included within its scope.

CONCLUSIONS, RAMIFICATIONS, AND SCOPE

It can be seen that the system for composing alphanumeric characters according to my invention substantially advances the present technology in the field. It does so specifically by creating a new configuration of line segments, this configuration permitting the creation of several new typefaces or fonts not now available in illuminated signage. Moreover, because of the specific configuration of line segments within the modules the present invention creates the potential for "moving" illuminated signage using alphanumerics created from line segments. Previously this was available only with dot-matrix characters. Additionally, the present invention introduces the possibility of the creation of decorative designs in illuminated signage or other displays, a use that does not occur with the systems presently in use.

Also, this system can be used in conjunction with a system for the creation of non-illuminated signage, (a patent application for which is presently in condition for allowance, see page 1 above.) Thus, in a sophisticated usage of the system, one can obtain a combination of decorative and alphanumeric elements, some of which were to be illuminable or reflective and some not, all in one coherent graphic style.

As indicated, the invention is not limited to signage but can also be used in any situation where the use of alphanumerics and/or decorative designs is desired.

Therefore, the examples of use in the fields of signage, decoration cired here are examples only and not meant to be exhaustive. Accordingly, the scope of the invention should be determined not be the examples given, but by the appended claims and their legal equivalents.

I claim:

1. A system of modules for constructing alphanumeric characters and decorative and figurative designs by assembling such modules in a coplanar array, comprising:
   a group of modules, each being shaped so that said modules can be assembled in a coplanar array in an adjacent manner,
   each module having a major surface circumscribed by a plurality of straight edges,
   each module having a plurality of line segments thereon, said line segments having the following configuration:
   (a) a straight line transversing said major surface from a point between the ends of one edge to an opposite edge,
   (b) a straight line transversing said major surface from a point between the ends of one edge to an opposite edge and intersecting said line of clause (a) at approximately a right angle,
   (c) four straight lines, each of said straight lines connecting an end of said line of clause (a) to an end of said line of clause (b) by transversing said major surface at approximately a 45 degree angle to the edges thereof,
   (d) four curved lines, each of said curved lines connecting an end of said line of clause (a) to an end of said line of clause (b) by transversing said major surface in a manner so that each of said curved lines is convex to its adjacent line of clause (c).

2. The system of claim 1 wherein a plurality of said modules are assembled in a coplanar array so as to form a plurality of alphanumeric characters.

3. The system of claim 2 wherein said line segment patterns on said compound modules are constructed of a material that allows said line segment patterns to be made differentially visible.

4. A system of modules for constructing alphanumeric characters and decorative and figurative designs by assembling such modules in a coplanar array, comprising:
   a group of modules, each being shaped so that said modules can be assembled in a coplanar array in an adjacent manner,
   each module having a major surface circumscribed by a plurality of straight edges,
   each module having a plurality of line segments thereon, said line segments having the following configuration:
   (a) a straight line tranversing said major surface from a point between the ends of one edge to an opposite edge,
   (b) a straight line transversing said major surface from a point between the ends of one edge to an opposite edge and intersecting said line of clause (a) at approximately a right angle,
   (c) four straight lines, each of said straight lines connecting an end of said line of clause (a) to an end of said line of clause (b) by transversing said major surface at approximately a 45 degree angle to the edges thereof, 5. The system of claim 4 wherein a plurality of said compound modules are assembled in a coplanar array so as to form a plurality of alphanumeric characters.

6. The system of claim 5 wherein said line segment patterns on said compound modules are constructed of a material that allows said line segment patterns to be differentially visible.

* * * * *